(12) United States Patent
Tanaka et al.

(10) Patent No.: US 6,999,140 B2
(45) Date of Patent: Feb. 14, 2006

(54) IMAGE DISPLAY APPARATUS AND METHOD OF MAKING SAME

(75) Inventors: Hironao Tanaka, Yamato (JP); Yukito Saitoh, Yamato (JP); Yasunobu Hiromasu, Fujisawa (JP)

(73) Assignee: Chi Mei Optoelectronics Corp., Tainan (TW)

( * ) Notice: Subject to any disclaimer, the term of this patent is extended or adjusted under 35 U.S.C. 154(b) by 22 days.

(21) Appl. No.: 10/739,545

(22) Filed: Dec. 18, 2003

(65) Prior Publication Data

US 2004/0189917 A1    Sep. 30, 2004

(30) Foreign Application Priority Data

Dec. 19, 2002    (JP) .............................. 2002-368855

(51) Int. Cl.
G02F 1/1333    (2006.01)
G02F 1/136    (2006.01)
G02F 1/1343    (2006.01)

(52) U.S. Cl. ..................... 349/110; 349/43; 349/111; 349/141

(58) Field of Classification Search ................. 349/43, 349/110, 111, 129, 141
See application file for complete search history.

(56) References Cited

U.S. PATENT DOCUMENTS

| | | | |
|---|---|---|---|
| 5,946,060 A | 8/1999 | Nishiki et al. | 349/48 |
| 5,986,735 A | 11/1999 | Komatsu | 349/128 |
| 6,115,093 A | 9/2000 | Murai et al. | 349/129 |
| 6,335,776 B1 | 1/2002 | Kim et al. | 349/129 |
| 6,404,475 B1 * | 6/2002 | Nakayoshi et al. | 349/141 |
| 6,583,836 B1 | 6/2003 | Kim et al. | 349/129 |
| 6,600,541 B1 * | 7/2003 | Kurahashi et al. | 349/141 |
| 6,603,525 B1 | 8/2003 | Yamakita et al. | 349/139 |
| 6,724,454 B1 * | 4/2004 | Kim et al. | 349/141 |
| 6,801,264 B1 * | 10/2004 | Kumagawa et al. | 349/38 |
| 2001/0043304 A1 | 11/2001 | Matsumoto | 349/141 |
| 2002/0018155 A1 | 2/2002 | Nagata et al. | 349/42 |
| 2003/0234903 A1 * | 12/2003 | Hong et al. | 349/141 |
| 2004/0046919 A1 * | 3/2004 | Kim | 349/141 |
| 2004/0160562 A1 | 8/2004 | Kusafuka et al. | 349/141 |

* cited by examiner

Primary Examiner—Tarifur R. Chowdhury
(74) Attorney, Agent, or Firm—Trop, Pruner & Hu, PC

(57) ABSTRACT

An image display apparatus comprises a pixel electrode, a common electrode, an aperture defined between the pixel electrode and the common electrode. The image display apparatus also includes a scanning line, a signal line, and a shield layer separate from the common electrode to block an electric field generated by at least one of the scanning line and signal line from passing through the aperture.

33 Claims, 13 Drawing Sheets

-- Prior Art --

-- Prior Art --

IMAGE DISPLAY APPARATUS AND METHOD OF MAKING SAME

TECHNICAL FIELD

The present invention relates to an image display apparatus that includes a shield layer to block an electric field from passing through an aperture.

BACKGROUND

Recently, in the field of image display apparatus that display images using the electro-optic effects of liquid crystal molecules, there has been proposed a so-called in-plane switching-type (hereafter, IPS-type) image display apparatus that applies an electric field to control the orientation of liquid crystal molecules in a direction parallel to the substrate surfaces that sandwich the liquid crystal layer containing the liquid crystal molecules. Compared to the conventional image display apparatus that applies an electric field in a direction perpendicular to the substrate, the IPS-type image display apparatus has superior characteristics with respect to voltage retention and viewing angle, and therefore, has held special promise in recent years.

In theory, this IPS-type image display apparatus is capable of high-quality display. In actuality, however, fluctuations in the electric potential of signal lines or scanning lines cause disruptions in the electric field that is applied to the liquid crystal layer. Such disruptions are not negligible, and as a result, image quality has not achieved sufficient improvement.

On the other hand, a configuration is known in which the size of the common electrode mounted on the array substrate is enlarged and the signal lines or scanning lines are covered to suppress the influence of electric field components, generated by fluctuations in the electric potential of signal lines or scanning lines, on the liquid crystal layer. For example, as shown in FIG. 12, a configuration comprising scanning line 101, signal line 102, thin film transistor 106 connected to scanning line 101 and signal line 102, pixel electrode 104 connected to signal line 102 via thin film transistor 106, and enlarged common electrode 105 has been proposed.

In the configuration as shown in FIG. 12, common electrode 105 is formed into a lattice shape, widened and arranged so as to cover scanning line 101 and signal line 102. This arrangement enables the electric field components generated by scanning line 101 and signal line 102 to be shielded by common electrode 105.

As another example, an IPS-type image display apparatus having a configuration that completely covers the signal and scanning lines by using a three-dimensionally configured common electrode has been proposed. Specifically, as shown in FIG. 13, by covering signal line 107 with upper electrode 108, lower electrode 109 and contact slit 110, this configuration shields the electric field generated from signal line 107.

As shown in FIG. 13, by adopting a configuration that three-dimensionally covers signal line 107, there is no electric field leakage from signal line 107 to the liquid crystal layer, and degradation of the display image quality is suppressed.

However, as shown in FIGS. 12 and 13, in the case of a configuration in which signal or scanning lines are covered by a common electrode, the aperture ratio may be decreased.

In the case of the configuration shown in FIG. 12, lattice-shaped common electrode 105 must be widened in order to effectively shield the electric field generated from signal line 101 and scanning line 102. In actuality, the electric field generated from signal line 101 and scanning line 102 contains not only components that propagate in a direction perpendicular to the array substrate, but also components that propagate in an oblique direction. Therefore, in order to shield those oblique components, the width of common electrode 105 must be increased. Moreover, it is necessary to allow for errors in positioning of the master pattern during fabrication. Thus, to position common electrode 105 on signal line 101 and scanning line 102, the width of common electrode 105 must be increased further.

In the case of the configuration shown in FIG. 13, it is necessary to additionally enlarge the width of the common electrode, due to the presence of contact slit 110 that is provided in a transverse orientation to signal line 107. In the case where contact slit 110 is arranged in the vicinity of signal line 107, and in the case where signal line 107 and contact slit 110 are arranged in close proximity, the capacitive coupling will influence the voltage fluctuation of signal line 107. Therefore, to lessen the parasitic capacitance generated between signal line 107 and contact slit 110, the configuration must position signal line 107 and contact slit 110 sufficiently far apart. The width of upper common electrode 108 must be enlarged further according to the distance between signal line 107 and contact slit. Even in the configuration shown in FIG. 13, the common electrode will have a large width.

However, generally, in an IPS-type image display apparatus, the electric field generated between a pixel electrode and a common electrode arranged on an array substrate is actually generated between the edge of the pixel electrode and the edge of the common electrode that faces opposite the pixel electrode. Therefore, in the case where the common electrode has a large width, the region that generates the transversely oriented electric field which contributes to the image display becomes narrower, and as a result, the aperture ratio decreases. With the decrease in aperture ratio, the region that contributes to image display becomes smaller in area and, in the image display apparatus configurations shown in FIGS. 12 and 13, brightness of the display image may be reduced.

SUMMARY

In general, according to one embodiment, an image display apparatus includes a pixel electrode, a common electrode, an aperture defined between the pixel electrode and the common electrode, a scanning line, a signal line, and a shield layer separate from the common electrode to block an electric field generated by at least one of the scanning line and signal line from passing through the aperture.

Other or alternative features will become apparent from the following description, from the drawings, or from the claims.

DETAILED DESCRIPTION

Figure 1:
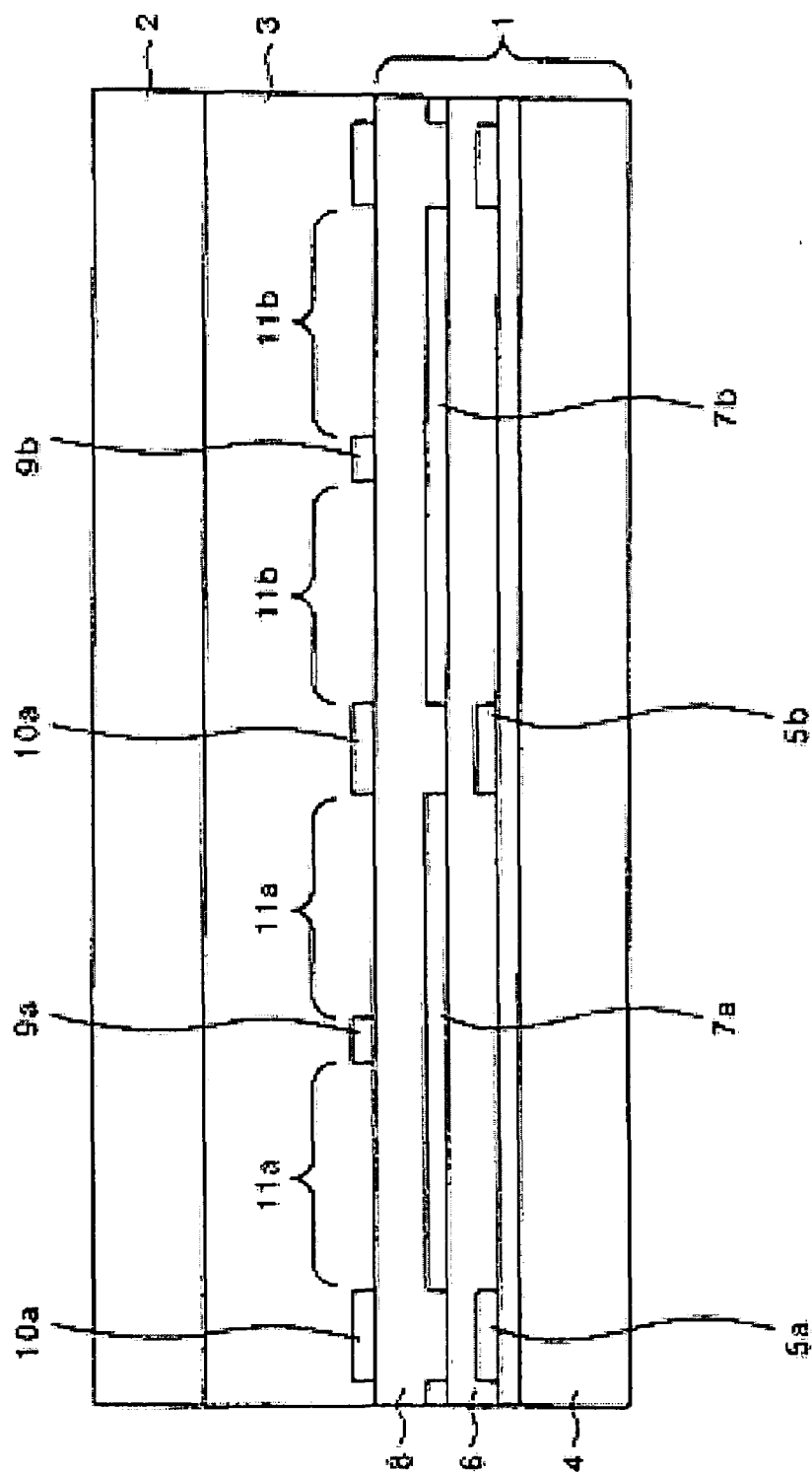
FIG. 1 is a schematic diagram illustrating the cross-sectional configuration of an image display apparatus according to one embodiment.

Below, an image display apparatus according to some embodiments of the present invention will be described with reference to the drawings. The drawings are in schematic form and thus may differ from the actual objects. Moreover, some of the drawings include parts whose corresponding dimensional relationships and ratios are different. Additionally, identification letters such as "a", "b", "c", etc. are appended to reference numerals as necessary, and in the case where a plurality of the identical elements exist, such as "signal lines 5a, 5b", those elements may be collectively notated as "signal line 5" as necessary.

In general, an image display apparatus according to some embodiments of the invention maintains a sufficient aperture ratio while suppressing the influence of an electric field, generated from circuitry arranged on an array substrate, on a liquid crystal layer.

An image display apparatus according to one example embodiment is a liquid crystal display apparatus. The liquid crystal display apparatus is an IPS-type image display apparatus in which an electric field shielding layer for the aperture part is provided separately from the common electrode, thereby suppressing the degradation of image quality due to electric fields arising from the electric potential of a signal line and/or scanning line and also reducing the size of the area occupied by the common electrode and enlarging the area of the aperture part. FIG. 1 is a schematic cross-sectional diagram illustrating the configuration of the image display apparatus of this example.

As shown in FIG. 1, the image display apparatus includes an array substrate 1, opposed array substrate 2 that is arranged to face opposite array substrate 1, and liquid crystal layer 3 that is sealed in between array substrate 1 and opposed array substrate 2. Moreover, array substrate 1 includes a signal line 5 arranged on substrate 4, protection layer 6 laminated on signal line 5, electric field shield layer 7 laminated on a partial area of protection layer 6, planarizing layer 8 laminated on electric field shield layer 7 and protection layer 6, pixel electrode 9 and common electrode 10 arranged on planarizing layer 8. Furthermore, aperture part 11 is an area on the surface of planarizing layer 8, demarcated by pixel electrode 9 and common electrode 10, and electric field shield layer 7 is an upper layer to signal line 5 and is arranged underneath aperture part 11

Figure 2:
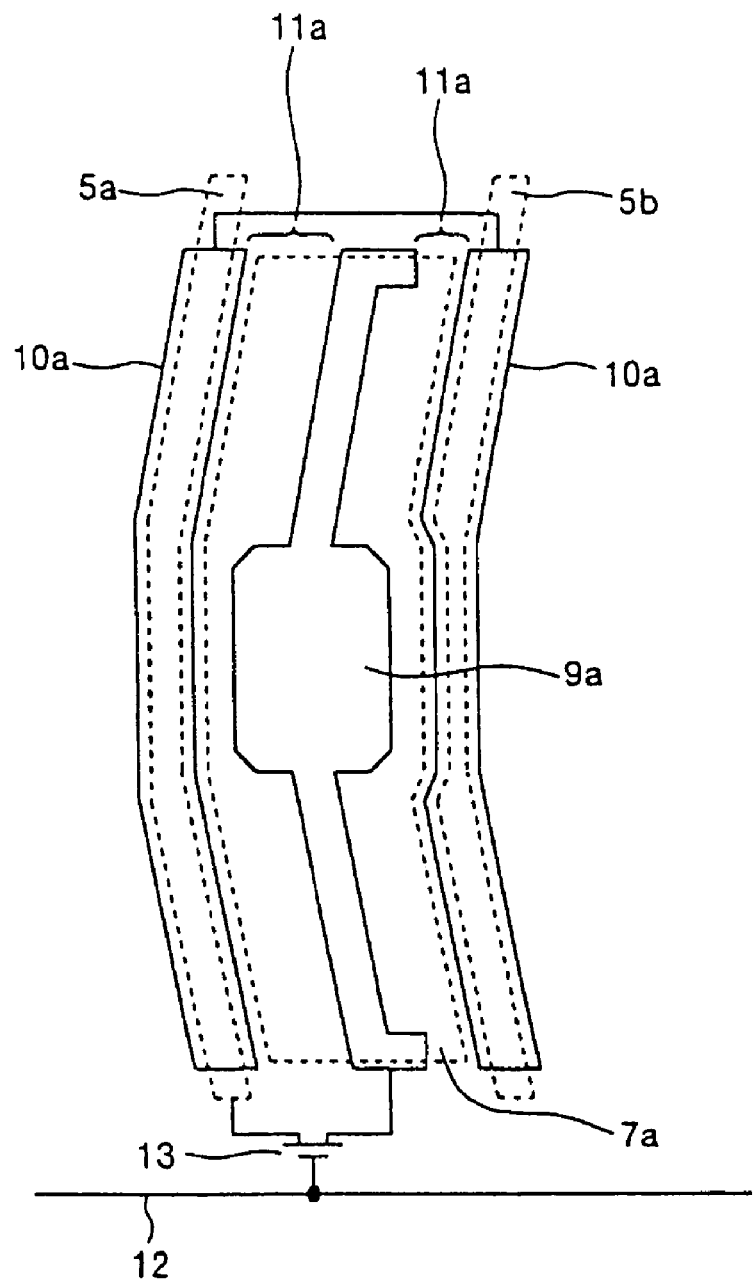
FIG. 2 is a schematic diagram illustrating the planar configuration of the image display apparatus of FIG. 1.

FIG. 2 is a plan view illustrating the configuration of a portion of array substrate 1. As shown in FIG. 2, pixel electrode 9a, which corresponds to a display element, is centrally arranged, and common electrode 10a is arranged so as to surround the periphery of pixel electrode 9a. Moreover, signal lines 5a and 5b are arranged longitudinally extended in a layer below common electrode 10a, and scanning electrode 12 is arranged laterally extended in the vicinity of pixel electrode 9a. Furthermore, signal line 5a and pixel electrode 9a are connected via thin film transistor 13, which is a switching element. The gate electrode of thin film transistor 13 is connected to scanning line 12.

In one implementation, substrate 4 and opposed substrate 2 are each formed with a colorless and transparent non-alkaline glass plate. Here, non-alkaline glass refers to a glass structure in which the content of alkaline substances such as $Na_2O$ and $K_2O$ is less than or equal to about 0.8 wt % (percent by weight). Array substrate 1 and opposed substrate 2, in order to avoid exerting an influence on the path of incident light from below, have excellent planarity of their surfaces and have low coefficients of thermal expansion. Additionally, substrate 4 and opposed substrate 2 may be formed from transparent plastic substrate, quartz glass, and the like. The electric field shield layer 7 is formed of a transparent and electrically conductive material. Moreover, to regulate the spacing between array substrate 1 and opposed substrate 2, a spacer (not shown in the drawing) is positioned between array substrate 1 and opposed substrate 2.

Liquid crystal layer 3 is formed predominantly from liquid crystal molecules that have an alignment. Fluorinated nematic liquid crystal molecules are an example of the type of liquid crystal molecules that may be used to constitute liquid crystal layer 3. Moreover, in addition to fluorinated nematic liquid crystal molecules, liquid crystal molecules that constitute smectic liquid crystal and cholesteric liquid crystal matter, and the like, may be used. In other words, liquid crystal molecules typically used for an IPS configuration can be used in liquid crystal layer 3 of this example.

Furthermore, in order to regulate the alignment of liquid crystal molecules in liquid crystal layer 3, array substrate 1 and/or opposed substrate 2 generally have a structure in which an alignment layer is provided on the surface that contacts liquid crystal layer 3. Array substrate 1 and/or opposed substrate 2 is surface-coated with an organic film such as polyimide or polyamic acid, then baked, and afterward, using a cotton, rayon or similar type of cloth, the organic film is rubbed in a prescribed direction to provide an alignment layer having an anisotropic surface structure. The alignment of the liquid crystal molecules is controlled by means of the anisotropy of the surface structure. Moreover, the alignment layer may also be formed as an inorganic film fabricated by such means as vapor deposition or sputtering and then irradiated by light, an ion beam and the like to make the surface structure anisotropic. Other configurations may be used as long as they are capable of regulating the alignment of the liquid crystal molecules.

The pixel electrode 9 generates a potential difference between itself and common electrode 10, in response to a prescribed electric potential supplied via thin film transistor 13, and to apply the transverse electric field arising from that potential difference to liquid crystal layer 3. The electric potential of pixel electrode 9 is controlled to change the value of the electric field applied to liquid crystal layer 3 and to control the alignment of liquid crystal molecules contained in liquid crystal layer 3.

The purpose of electric field shield layer 7 is to inhibit the electric fields arising from the electric potentials of signal line 5 and scanning line 12 from reaching liquid crystal layer 3. Specifically, electric field shield layer 7 is formed from a layer such as an ITO (indium tin oxide) or IZO (indium zinc oxide) transparent conductive layer, and is connected to a prescribed constant-potential supply circuit that has nearly constant electric potential. In addition, the same constant-potential circuit connected to electric field shield layer 7 may also be used with common electrode 10. Alternatively, separate and distinct circuitry may also be used.

The operation of the image display apparatus according to an embodiment is explained below. First, the driving state of thin film transistor 13 is controlled by an electric potential supplied by scanning line 12. When thin film transistor 13 is on, electric potential is supplied from signal line 5a to pixel electrode 9a. By supplying electric potential to pixel electrode 9a, a potential difference arises between pixel electrode 9a and common electrode 10a, and an electric field is generated that is oriented transversely with respect to liquid crystal layer 3. The transversely oriented electric field controls the direction of alignment of liquid crystal molecules contained in liquid crystal layer 3. Moreover, aperture part 11a, through which light actually penetrates and contributes to the image display, is demarcated by pixel electrode 9a and common electrode 10a, and electric field shield layer 7 is arranged underneath this aperture part 11a so as to cover aperture part 11a. This structure is arranged on array substrate 1 in a matrix shape corresponding to the display pixels, and images are displayed by varying the light transmittance corresponding to each individual display pixel.

Figure 3:
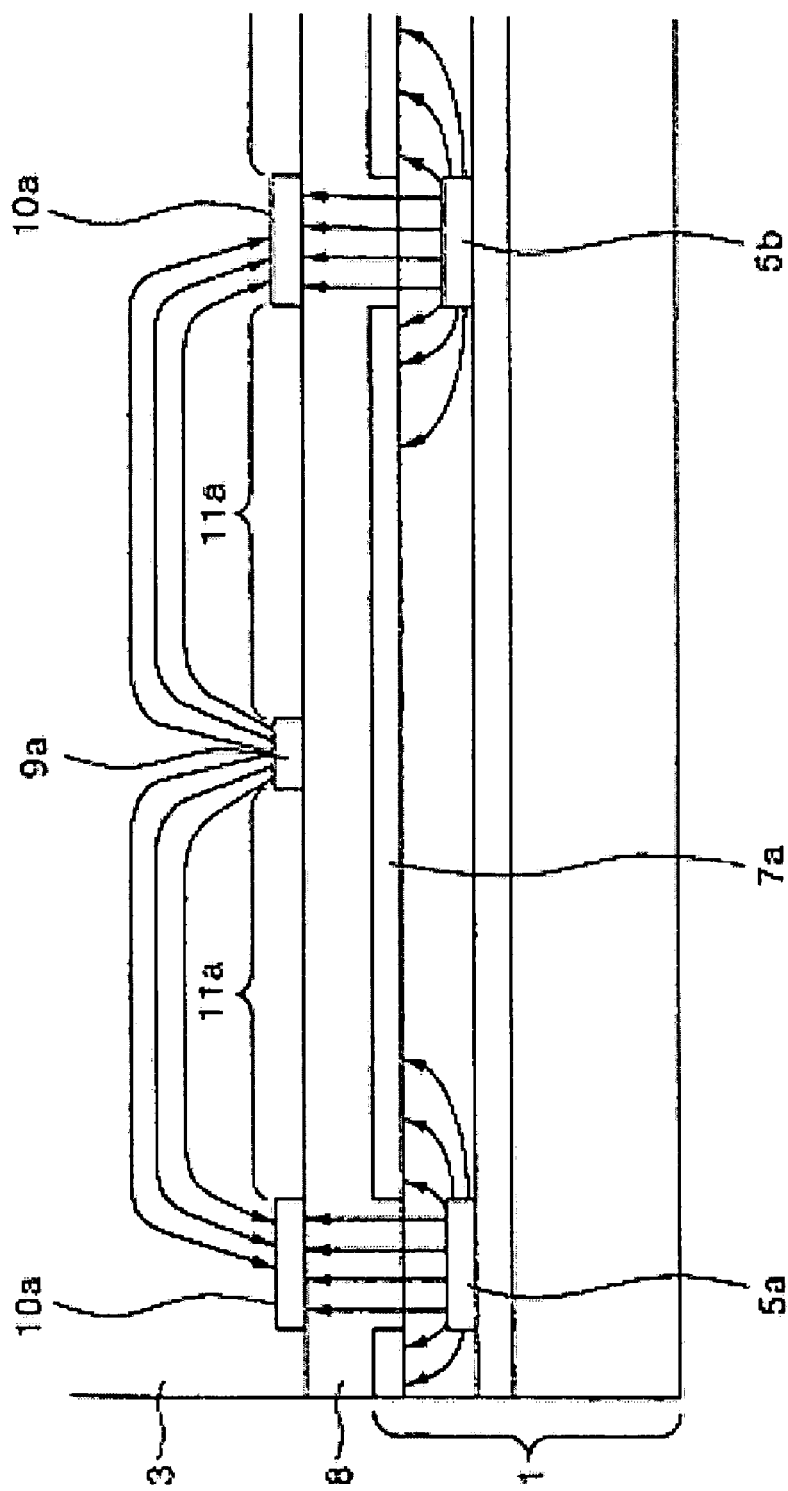
FIG. 3 is a diagram that explains the functions of an electric field shield layer in the image display apparatus of FIG. 1.

Functions of electric field shield layer 7 of the image display apparatus according to an embodiment is explained below. FIG. 3 is a schematic illustration that explains the functions of electric field shield layer 7. As shown in FIG. 3, the electric potential supplied to pixel electrode 9 causes a transverse electric field, indicated by arrows in the diagram, to be generated above array substrate 1, between pixel electrode 9 and common electrode 10, and images are displayed accordingly. Meanwhile, as described above, signal line 5 is provided with a prescribed electric potential to supply an electric potential to pixel electrode 9, and the electric potential of signal line 5 causes an electric field to be generated. Since this electric field contributes to the degradation of display image quality, it is undesirable for this field to reach liquid crystal layer 3.

Electric field shield layer 7 is arranged so as to cover aperture part 11a and therefore shields those components of the electric field, generated from signal line 5, which would penetrate through aperture part 11a and exert an influence on liquid crystal layer 3. As shown in FIG. 3, because electric field shield layer 7 is positioned as an upper layer to signal line 5, it is capable of shielding upward directed components of the electric field generated from signal line 5. Moreover, electric field shield layer 7 is arranged so as to cover aperture part 11 and therefore is capable of shielding those components of the upward directed portion of an electric field, generated from signal line 5, which in particular would penetrate through aperture part 11 and exert an influence on liquid crystal layer 3. Furthermore, in the configuration of this example, electric field shield layer 7 is not arranged directly above signal line 5. Instead, the common electrode 10a is arranged directly above signal line 5, which makes it possible to shield the electric field from the liquid crystal layer 3 by means of common electrode 10a. Moreover, the electric field generated from scanning line 12 is not shown in FIG. 3, but based on similar principles as in the case of signal line 5, the electric field generated from the scanning line 12 is shielded by electric field shield layer 7 and degradation of image quality is suppressed.

Accordingly, with the image display apparatus of this example, shielding of the electric fields arising from the electric potentials of signal line 5 and scanning line 12 is performed not just by common electrode 10, but also by electric field shield layer 7. In an image display apparatus of conventional configuration, shielding of the electric fields arising from signal lines and the like is performed by a common electrode, and therefore, in order to sufficiently shield the electric field, it is necessary to increase the size of the area occupied by the common electrode on the array substrate surface. As a result, the area of the aperture part in a conventional image display apparatus that contributes to image display is reduced, causing such problems as lower brightness of the display image. On the other hand, in the image display apparatus of according to an embodiment, because electric field shield layer 7 is provided separately from common electrode 10, there is no need to extend common electrode 10 for shielding the electric fields arising from the electric potentials of signal line 5 and scanning line 12. As a result, flexibility in the design of the shape of the common electrode can be achieved.

Accordingly, by reducing the size of the area occupied by common electrode 10, the area of the aperture part may be increased, enabling display image brightness to be improved. Thus, the image display apparatus according to an embodiment not only inhibits degradation of image quality due to the influence of electric fields arising from signal line 5 and scanning line 12, on liquid crystal layer 3, but also reduces the size of the area occupied by common electrode 10, enabling the area of aperture part 11 to be enlarged and the image display to achieve higher brightness.

The inhibition of image quality degradation, arising from the electric potentials of signal line 5 and scanning line 12, by means of the provided electric field shield layer 7 is explained below. The provision of electric field shield layer 7 can suppress crosstalk, burn-in and after-imaging to levels that are imperceptible visually. Computations represented by the graphs shown in FIGS. 4 to 7 are explained below. Note that FIGS. 4 to 7 show the lower half portion of the area that is formed by aperture part 11 and pixel electrode 9; therefore, pixel electrode 9 has been omitted.

Figure 4:
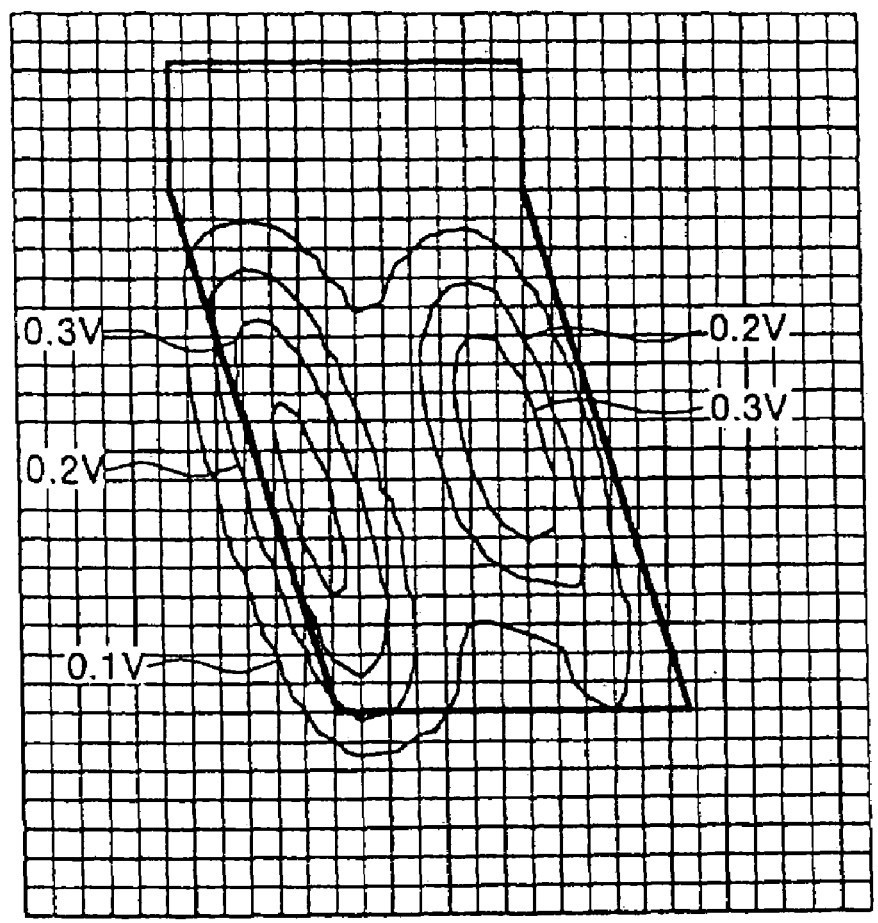
FIG. 4 is a diagram that illustrates the effect of signal line electric potential on the distribution of electric potential at the surface of the array substrate in a conventional image display apparatus.

The result of the fluctuation in electric potential at the array substrate surface arising from the electric potential of the signal line is first explained. FIG. 4 is provided for the purpose of comparison, and depicts electric potential regions of an image display apparatus of conventional configuration that does not have an electric field shield layer 7. In addition, the image display apparatus of conventional configuration has the same configuration, in all aspects other than the provision of an electric field shield layer, as the image display apparatus according to one embodiment. Moreover, in FIG. 4, the electric potential of the signal line is set to 10V, the electric potential of the scanning line is set to 0V, and the electric potential of the common electrode is set to 0V. Furthermore, since the electric potential of the scanning line is 0V, the thin film transistor is in the off state. Because the signal line and pixel electrode are electrically unconnected, the electric potential of the pixel electrode becomes 0V and an electric field is not generated between the pixel electrode and common electrode.

Accordingly, although the electric potential on the surface of this array substrate should be maintained at 0V over the entire surface, in the case of the image display apparatus of conventional configuration, in actuality, as shown in FIG. 4, due to the influence of the electric potential of the signal line, elliptically-shaped electric potential regions having their major axes oriented parallel to the extended direction of the signal line occur on the surface of the array substrate. Specifically, an electric potential of approximately 0.1V to 0.5V is generated in such electric potential regions. As described above, because lines other than the signal line are set to an electric potential of 0V, the electric potential regions shown in FIG. 4 may be caused by the electric potential of the signal line. Accordingly, the existence of such electric potential regions may give rise to crosstalk when images are displayed.

Figure 5:
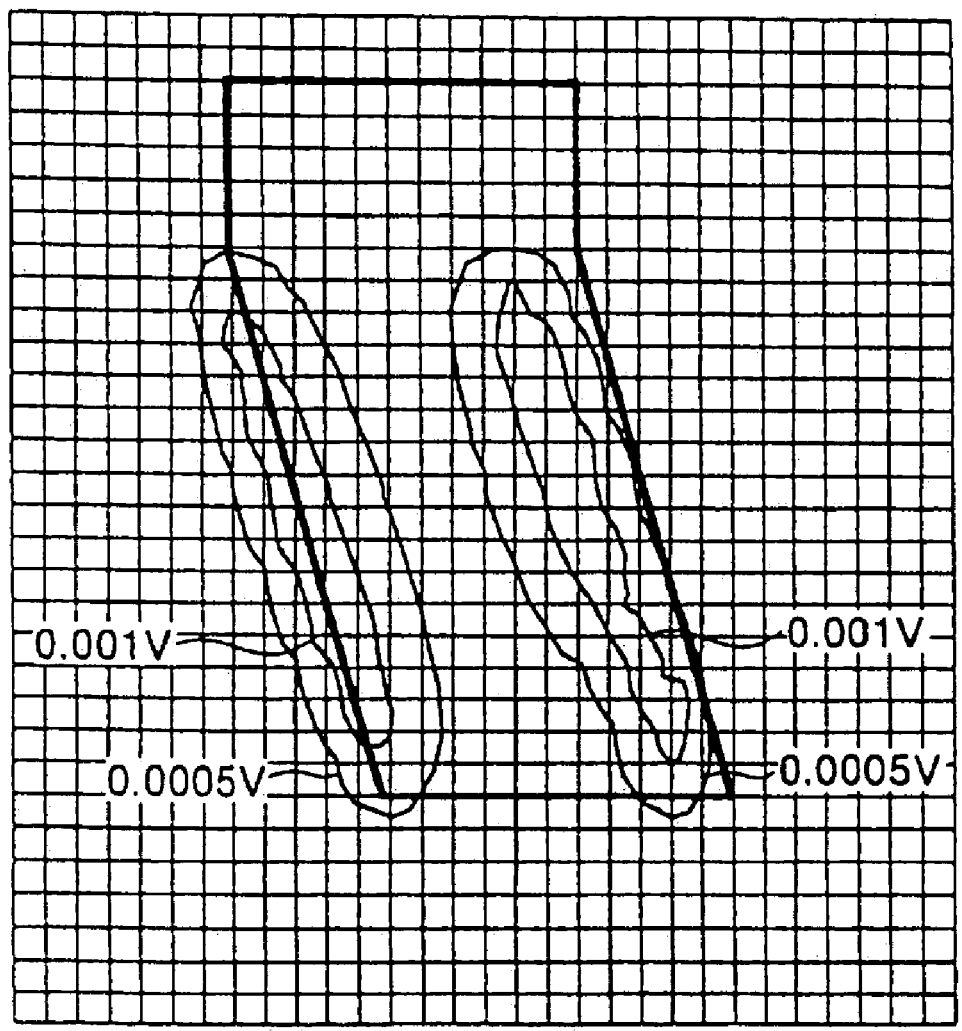
FIG. 5 is a diagram that illustrates the effect of signal line electric potential on the distribution of electric potential at the surface of the array substrate in the image display apparatus of FIG. 1.

On the other hand, FIG. 5 shows the results of the same numerical computations in the case of the image display apparatus according to an embodiment. As in the case of FIG. 4, the electric potential of signal line 5 is set to 10V and the electric potential of other lines is set to 0V. Moreover, the electric potential of electric field shield layer 7 is also set to 0V. As shown in FIG. 5, in the image display apparatus according to one embodiment, the influence of the electric potential of signal line 5 is suppressed to a much lower level than in the case of FIG. 4. Specifically, although there exist regions of constant electric potential corresponding to the electric potential of the signal line, the fluctuation of electric potential is suppressed to a range of approximately 0.0005V to 0.001V, and even in regions of the highest fluctuating electric potentials, the fluctuation of electric potential is suppressed to approximately $\frac{1}{50}$ that of the case in which an electric field shield layer was not provided. Consequently, the image display apparatus according to one embodiment reduces the generation of crosstalk to a level that is visually imperceptible to provide enhanced performance and display of high-quality images.

Figure 6:
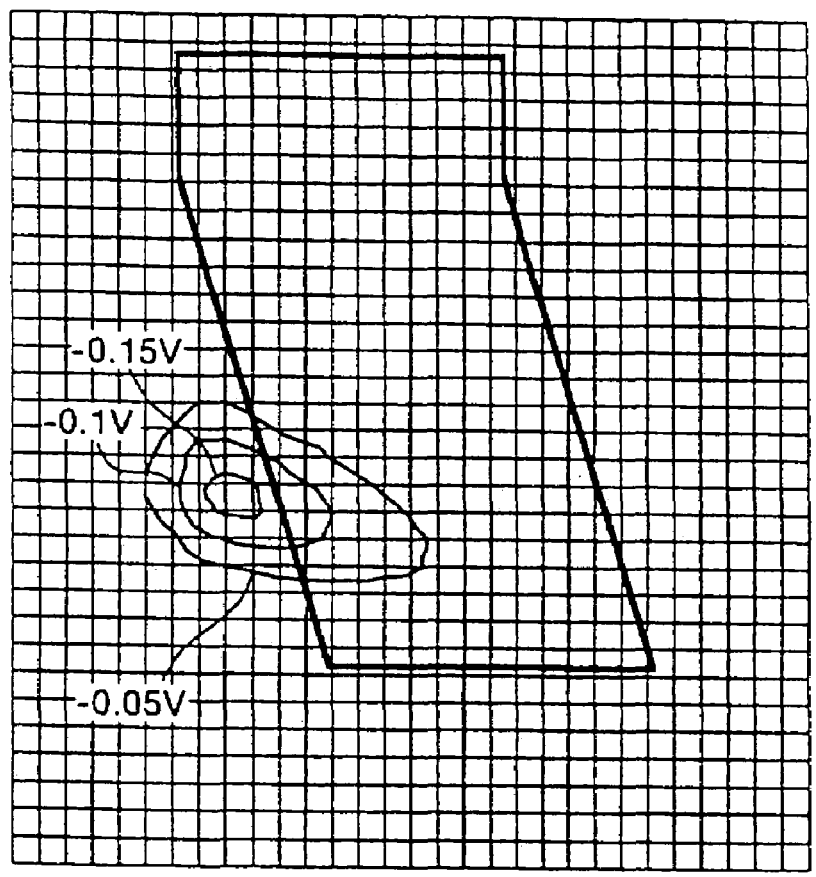
FIG. 6 is a diagram that illustrates the effect of scanning line electric potential on the distribution of electric potential at the surface of the array substrate in a conventional image display apparatus.

The fluctuation of electric potential on the array substrate surface, arising from the electric potential of the scanning line, is explained below. FIG. 6 is provided for the purpose of comparison, and depicts electric potential regions of an image display apparatus of conventional configuration that does not have an electric field shield layer. In FIG. 6, the electric potential of the scanning electrode is set to -15V and the electric potentials of the signal line, pixel electrode and common electrode are set to 0V.

As shown in FIG. 6, in an image display apparatus of conventional configuration, on the surface of the array substrate, regions of prescribed electric potential exist in the lower left region of the aperture part. Specifically, these electric potential regions have voltage potentials that are approximately 0.1V to 0.2V lower than their surroundings, and the existence of the electric potential regions may give rise to burn-in and after-imaging when images are displayed.

Figure 7:
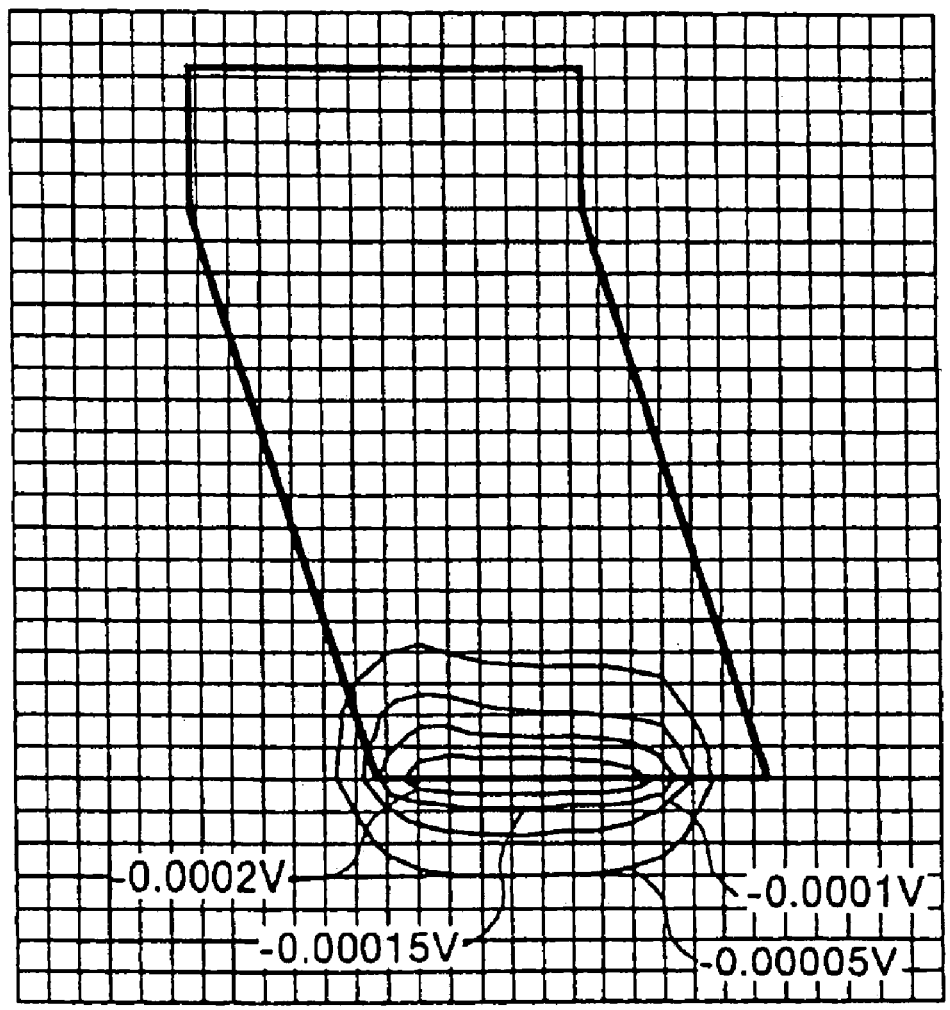
FIG. 7 is a diagram that illustrates the effect of scanning line electric potential on the distribution of electric potential at the surface of the array substrate in the image display apparatus of FIG. 1.

On the other hand, with the image display apparatus according to an embodiment, the fluctuation of electric potential on the surface of array substrate 1, arising from the electric potential of the scanning line, can be suppressed to a level that is negligible for practical usage. FIG. 7 shows the result of numerical computations pertaining to the image display apparatus according to one embodiment that is provided with an electric field shield layer. As shown in FIG. 7, with the image display apparatus of this embodiment, in contrast to the case of FIG. 6, the fluctuation of electric potential on the surface of array substrate 1 is suppressed to a level that is non-problematic for practical applications. Specifically, although there exist regions of prescribed electric potential arising from the electric potential of scanning line 12, the potential difference between those regions and] the surroundings thereof range from approximately 0.00005V to 0.0002V, and the electric potentials are suppressed to $\frac{1}{100}$ or less than those of an image display apparatus of conventional configuration. Therefore, in the image display apparatus of this embodiment, because there is no fluctuation of the electric potential on the surface of array substrate 1 arising from the electric potential of scanning line 12 and there is also no disturbance of the alignment of liquid crystal molecules contained in liquid crystal layer 3 that is arranged on array substrate 1, image display is possible in which burn-in and after-imaging are suppressed to a level that is imperceptible visually.

Below, the excellent correspondence between the electric potential of pixel electrode 9 and the optical transmittance of liquid crystal layer 3 in the image display apparatus according to an embodiment is explained. Generally, in an image display apparatus, in order to enable high quality image display, it is desirable that there be a one-to-one relationship between the electric potential of pixel electrode 9 and the optical transmittance of liquid crystal layer 3. However, in the case where the electric potential of pixel electrode 9 is changed from a low to high electric potential or from a high to low electric potential, it is known that the optical transmittance of liquid crystal layer 3, in actuality, will take on slightly different values, even at the same electric potential.

Figure 8:
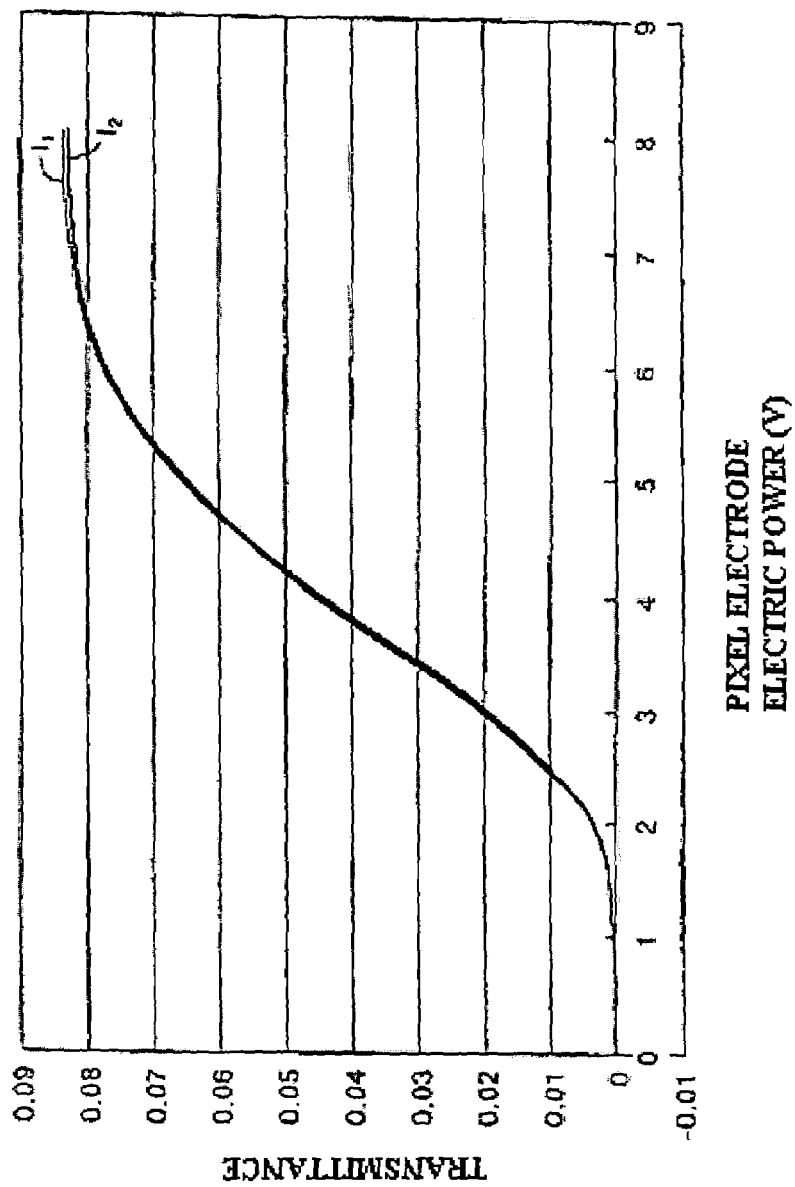
FIG. 8 is a graph illustrating the relationship between the electric potential of a pixel electrode and optical transmittance of a liquid crystal layer for a conventional image display apparatus.

FIG. 8 is a graph illustrating the relationship between electric potential of the pixel electrode and optical transmittance of the liquid crystal layer for a conventional image display apparatus. In FIG. 8, curve $1_1$ indicates the change in optical transmittance of the liquid crystal layer in the case where the electric potential of the pixel electrode has been shifted from a low to high electric potential, and curve $1_2$ indicates the change in optical transmittance of the liquid crystal layer in the case where the electric potential of the pixel electrode has been shifted from a high to low electric potential.

As shown in FIG. 8, with the conventional image display apparatus, in the case of a shift in electric potential of the pixel electrode from a low to high electric potential (curve $1_1$), and in the case of a shift from a high to low electric potential (curve $1_2$), the optical transmittance of the liquid crystal layer will take on slightly different values even at the same electric potential of the pixel electrode. Therefore, with an image display apparatus of conventional configuration, even if the same electric potential is applied to a pixel electrode for the purpose of achieving a color display of identical gradation, depending on the direction of shift of the electric potential, a color of different gradation will be displayed.

Figure 9:
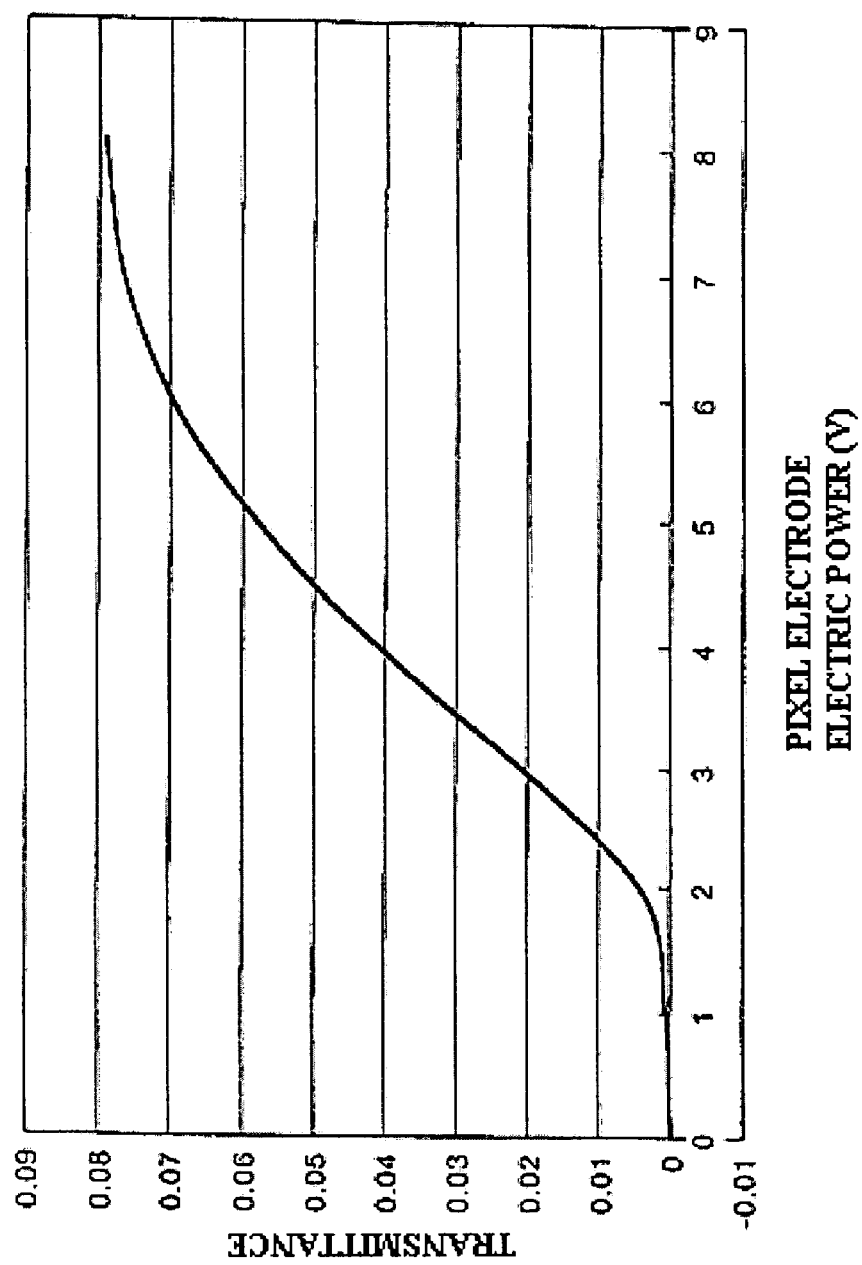
FIG. 9 is a graph illustrating the relationship between the electric potential of a pixel electrode and optical transmittance of a liquid crystal layer for the image display apparatus of FIG. 1.

On the other hand, with the image display apparatus according to an embodiment, the optical transmittance of liquid crystal layer 3 does not change according to the direction of shift of the electric potential. FIG. 9 is a graph illustrating the relationship between electric potential of the pixel electrode and optical transmittance of the liquid crystal layer for the image display apparatus according to an embodiment. As shown in FIG. 9, with this image display apparatus, changes in the optical transmittance of liquid crystal layer 3 are in nearly complete agreement for the case of a shift in electric potential of pixel electrode 9 from a low to high electric potential and in the case of a shift from a high to low electric potential. Accordingly, regardless of the direction of shift of the electric potential, a one-to-one relationship between the electric potential of pixel electrode 9 and the optical transmittance of liquid crystal layer 3 is indicated, and high-quality image display is possible.

Figure 10:
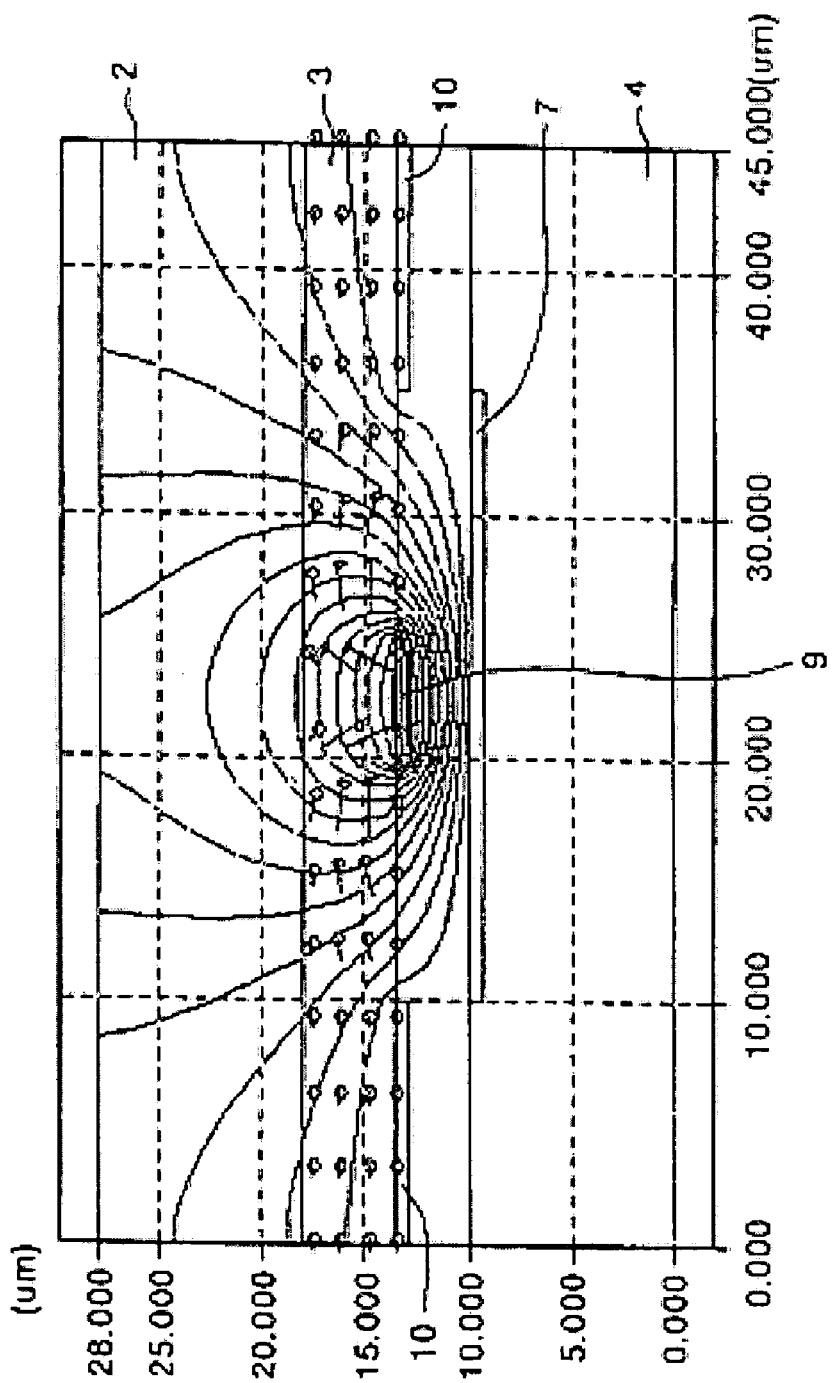
FIG. 10 is a graph illustrating the relationship between the electric potential of a pixel electrode and optical transmittance of a liquid crystal layer for the image display apparatus of FIG. 1.

The provision of electric field shield layer 7 does not affect the control of liquid crystal molecular alignment during image display. FIG. 10 illustrates the alignment state of liquid crystal molecules when a prescribed electric potential is applied to pixel electrode 9. Despite the deployment of electric field shield layer 7, there is no disturbance of liquid crystal layer 3 due to a transverse electric field, and the alignment state of the liquid crystal molecules is controlled without problem. The electric potential distribution and state of liquid crystal molecular alignment is depicted for the case where an 8V electric potential is applied to pixel electrode 9 and the electric potential of electric field shield layer 7 and common electrode 10 is set to 0V. In FIG. 10, each curve indicates an equipotential line, and the white circles and straight lines extending from the white circles in liquid crystal layer 3 indicate the liquid crystal molecules and the alignment state of the liquid crystal molecules, respectively.

As shown in FIG. 10, in the region of liquid crystal layer 3 that corresponds to aperture part 11, equipotential lines are nearly perpendicular to array substrate 1, and in the region corresponding to aperture part 11, a generated transverse electric field is shown. Moreover, in the region corresponding to aperture part 11, the liquid crystal molecules are also aligned in nearly a transverse direction, and it is shown that electric field shield layer 7 does not cause a disturbance of the alignment state of the liquid crystal molecules. This indicates that electric field shield layer 7 does not cause a substantial decrease in the aperture ratio, and differing from the conventional apparatus configuration, there is no need to sacrifice the aperture ratio in order to shield the electric fields arising from the signal line and scanning line. Therefore, with the image display apparatus according to one embodiment, despite the deployment of electric field shield layer 7, there is no particular influence exerted on the alignment state of liquid crystal molecules during image display, and a sufficient aperture ratio can be realized.

As explained above, with the image display apparatus according to an embodiment, by using a configuration in which electric field shield layer 7 is arranged on a layer between the surface of array substrate 1 and signal line 5 and/or scanning line 12, and so as to cover aperture part 11, electric field components arising from the electric potential of signal line 5 and scanning line 12 are inhibited from passing through aperture part 11 to liquid crystal layer 3 during image display. Moreover, as shown in FIGS. 9 and 10, the provision of electrical field shield layer 7 has no adverse effect on the transverse electric field and the like, and high quality image display is possible. Also, because electric field shielding layer 7 is provided separately and distinctly from common electrode 10, the size of the area occupied by common electrode on the surface of array substrate 1 can be reduced. Therefore, the area of aperture part 11 that directly contributes to image display can be enlarged, and an image display of higher brightness can be realized.

Figure 11:
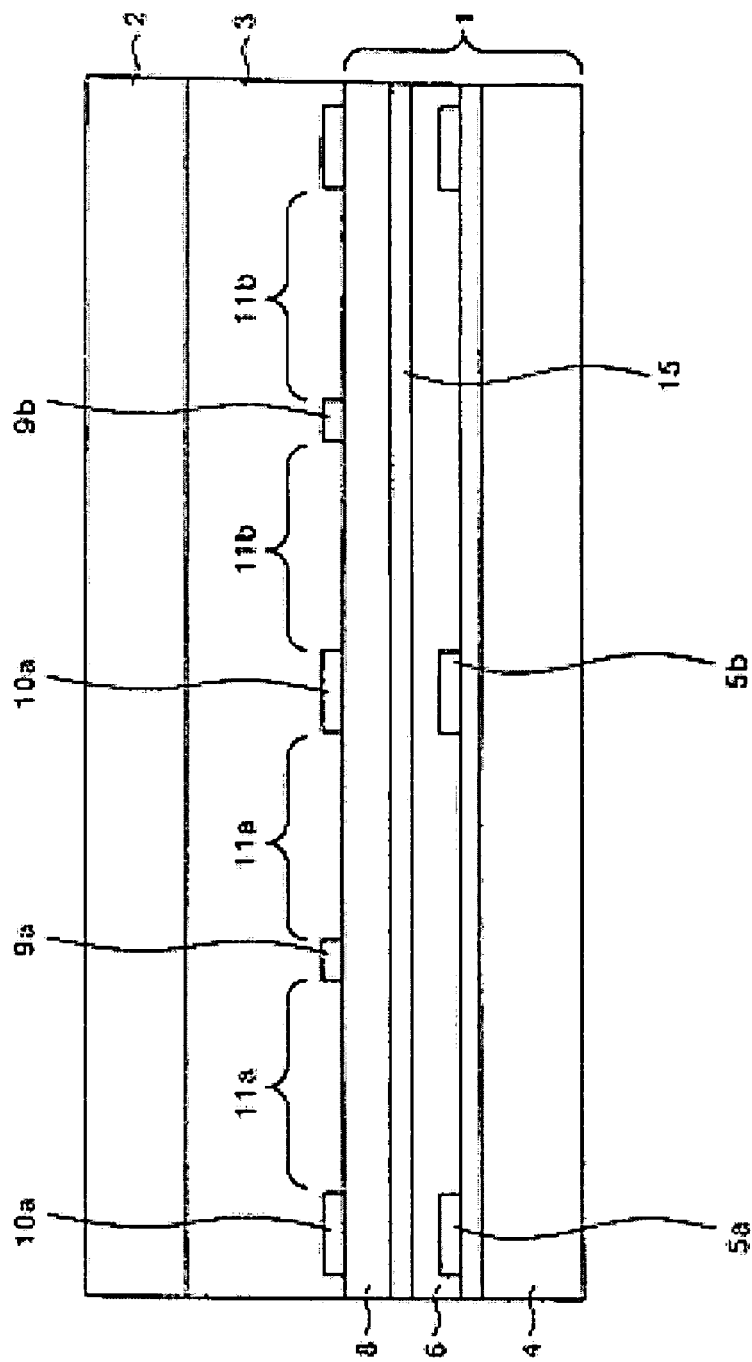
FIG. 11 is a schematic diagram illustrating the cross-sectional configuration of an image display apparatus according to another embodiment.
Figure 12:
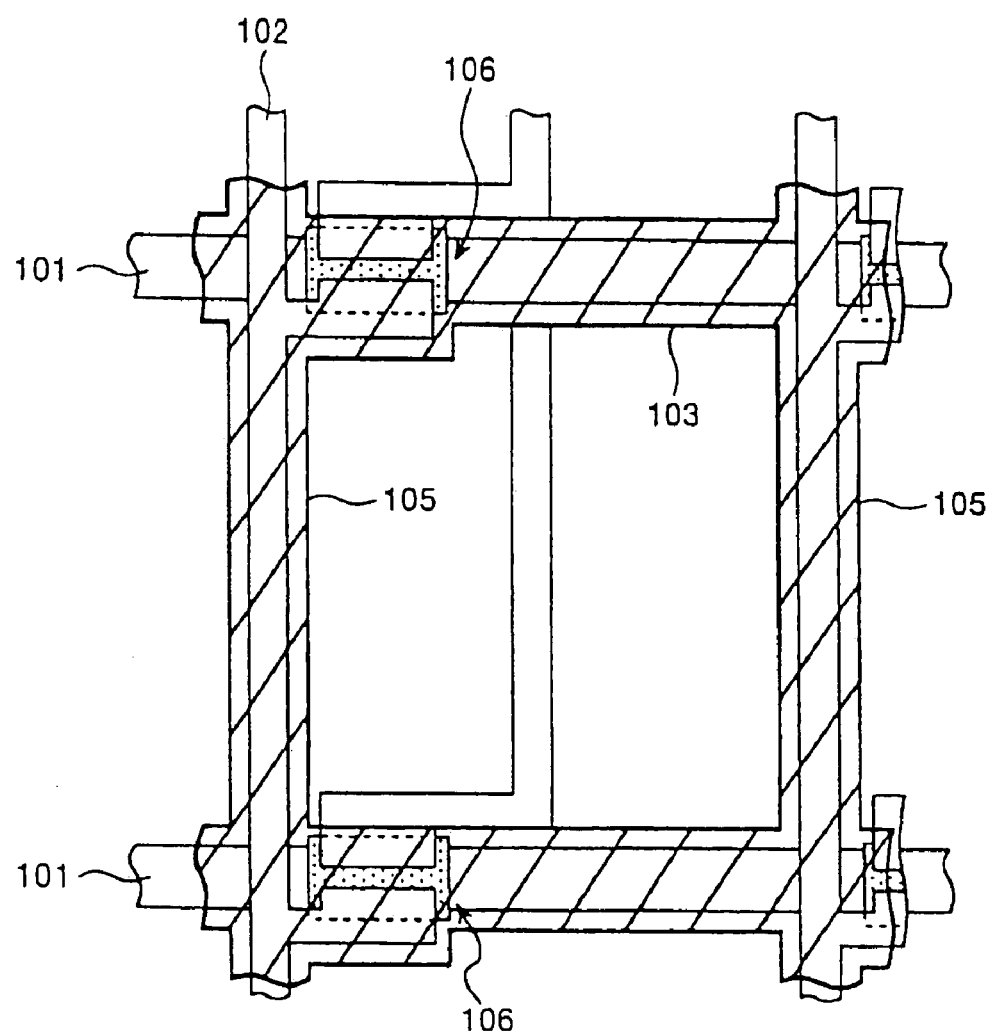
FIG. 12 is a schematic diagram illustrating the configuration of a conventional image display.
Figure 13:
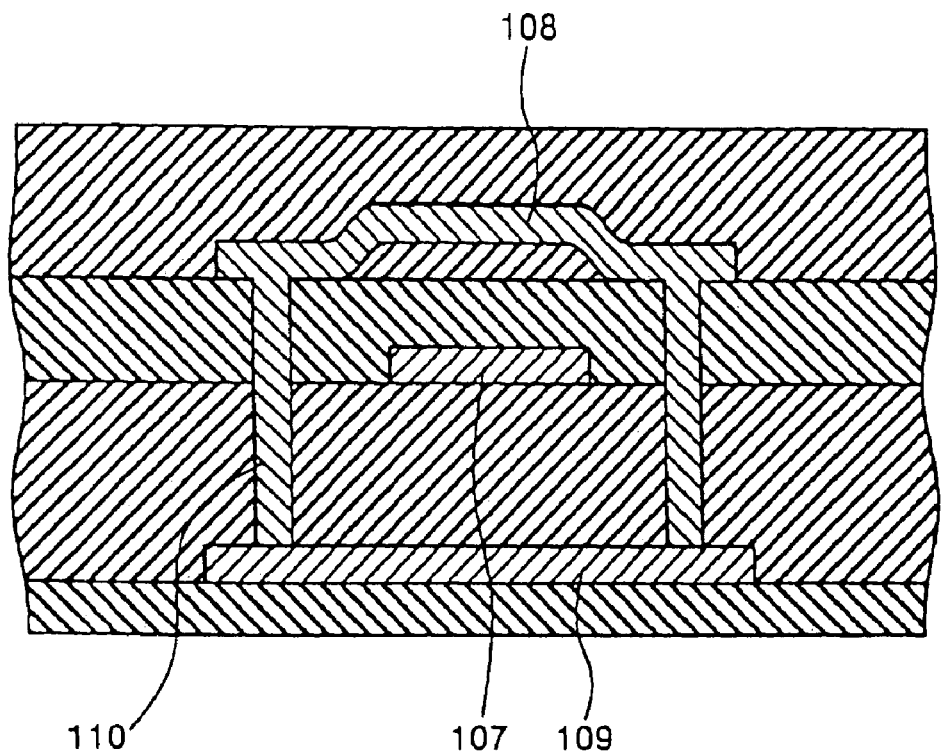
FIG. 13 is a schematic diagram illustrating the configuration of another conventional image display apparatus.

FIG. 11 illustrates an image display apparatus according to another embodiment. The image display apparatus shown in FIG. 11 has a configuration in which electric field shield layer 15 covers not only aperture part 11, but is provided uniformly on the top surface of protection layer 6. In the case of this configuration, because all upward directed components of the electric fields generated from signal line 5 and scanning line 12 can be shielded by electric field shield layer 15, that electric field can be completely prevented from influencing the alignment of liquid crystal molecules contained in liquid crystal layer 3. In the case of the embodiment shown in FIG. 11, because it is unnecessary for common electrode 10 to act as an electric field shield, the shape and positioning of common electrode 10 can be determined without regard to the position of signal line 5, and common electrode 10 can be made, for example, narrower than the width of signal line 5.

Moreover, in the image display apparatus according to some embodiments, instead of connecting the electric field shield layer to a constant-potential circuit, the electric field shield layer may be made to function as a floating layer, electrically isolated from other wiring structures. This is because, even in the case of such a configuration, the size of the electric field shield layer may be enlarged sufficiently to shield the electric fields arising from signal line 5 and scanning line 12.

As described above, according to some embodiments of the present invention, because the configurations are each provided with an electric field shield layer arranged above a signal line and/or a scanning line and below the aforementioned pixel electrode, the electric potential of the signal line and/or scanning line is shielded by the electric field shield layer and inhibited from reaching the array substrate surface. Compared to the conventional design in which the electric field is shielded by only a common electrode, the common electrode can be designed with a greater degree of freedom and a higher aperture ratio, which is effective for achieving an image display of high quality and high brightness.

Moreover, according to some embodiments of the present invention, because the configurations each has an electric field shield layer arranged directly below the aperture part through which light penetrates and contributes directly to the image display, those components of the electric field arising from the signal line and/or scanning line that would reach the aperture part can be shielded efficiently. This is effective for achieving an image display of high quality and high brightness.

Moreover, according to some embodiments of the present invention, because the electric field shield layer is provided over the entire surface of a layer between a scanning line and/or signal line and a common electrode, nearly all upward directed components of the electric field arising from the scanning line and/or signal line are shielded. As a result, the electric field can be inhibited from reaching the array substrate surface, and since there is no need for the common electrode to perform an electric field shielding function, the size of the area occupied by the common electrode can be reduced, which is effective for achieving an image display of high quality and high brightness.

While the present invention has been described with respect to a limited number of embodiments, those skilled in the art, having the benefit of this disclosure, will appreciate numerous modifications and variations there from. It is intended that the appended claims cover all such modifications and variations as fall within the true spirit and scope of this present invention.

What is claimed is:

1. An image display apparatus, comprising:
   a pixel electrode;
   a common electrode;
   an aperture defined between the pixel electrode and the common electrode;
   a scanning line;
   a signal line; and
   a shield layer separate from the common electrode to block an electric field generated by at least one of the scanning line and signal line from passing through the aperture.

2. An image display apparatus according to claim 1, wherein the shield layer comprises an electrically conductive layer.

3. An image display apparatus according to claim 2, further comprising a supply circuit to provide a constant potential, the shield layer electrically connected to the constant potential.

4. An image display apparatus according to claim 1, further comprising a switching element controllable by the scanning line to electrically connect the signal line to the pixel electrode.

5. An image display apparatus according to claim 1, wherein the shield layer is disposed in a space between the common electrode and at least one of the scanning line and signal line.

6. An image display apparatus according to claim 5, wherein the shield layer covers the aperture.

7. An image display apparatus according to claim 6, wherein the shield layer is electrically conductive.

8. An image display apparatus according to claim 7, wherein the aperture and shield layer are arranged to enable light to pass through the aperture.

9. An image display apparatus according to claim 8, wherein the shield layer is formed of a transparent material.

10. An image display apparatus according to claim 1, wherein the shield layer and common electrode are maintained at about a first electrical potential.

11. An image display apparatus according to claim 1, further comprising a first substrate, the first substrate comprising the signal line and shield layer, wherein the pixel electrode and common electrode are disposed on the first substrate.

12. An image display apparatus according to claim 11, further comprising a second substrate opposed to the first substrate.

13. An image display apparatus according to claim 12, further comprising a liquid crystal layer between the first and second substrate.

14. An image display apparatus according to claim 13, wherein the first and second substrates are each formed of a transparent material.

15. An image display apparatus according to claim 1, further comprising additional common electrodes, wherein the shield layer comprises gaps vertically aligned with respective common electrodes.

16. An image display apparatus according to claim 15, further comprising additional signal lines, wherein the signal lines are vertically aligned with respective gaps.

17. An image display apparatus according to claim 16, wherein the common electrodes and shield layer are adapted to block electric fields generated by the signal lines.

18. An image display apparatus according to claim 1, wherein the shield layer extends continuously across a horizontal please of the image display apparatus.

19. An image display apparatus according to claim 18, wherein the layer is formed of an electrically conductive and transparent material.

20. An in-plane switching-type image display apparatus, comprising:
    a pixel electrode corresponding to a display pixel;
    a common electrode;
    an aperture part defined by said pixel electrode and said common electrode; and
    an array substrate, the pixel electrode and common electrode being provided on the array substrate,
    wherein image display is performed by controlling the electric potential of said pixel electrode to generate an electric field parallel to a surface of said array substrate,
    wherein said array substrate comprises:
      a switching element that controls the electric potential of said pixel electrode,
      a scanning line that supplies a signal to said switching element, and
      a transparent electric field shield layer disposed in a space between said common electrode and said scanning line.

21. An image display apparatus according to claim 20, wherein said electric field shield layer is arranged directly below said aperture part.

22. An image display apparatus according to claim 20, further comprising a signal line electrically connectable to the pixel electrode by the switching element.

23. An image display apparatus according to claim 22, wherein said electric field shield layer is arranged over the entire surface of a layer positioned above at least one of said scanning line and said signal line and below said common electrode.

24. An image display apparatus according to claim 20, wherein said electric field shield layer is formed from an electrically conductive material.

25. An image display apparatus according to claim 20, wherein said electric field shield layer is insulated from other wiring structures on said array substrate and functions as a floating layer.

26. An image display apparatus according to claim 20, further comprising an opposed substrate that faces opposite said array substrate and a liquid crystal layer that is sealed-in between said array substrate and said opposed array substrate.

27. An in-plane switching-type image display apparatus, comprising:
    a pixel electrode corresponding to a display pixel;
    a common electrode;
    an aperture part defined by said pixel electrode and said common electrode; and
    an array substrate, the pixel electrode and common electrode being provided on the array substrate,
    wherein image display is performed by controlling the electric potential of said pixel electrode to generate an electric field parallel to a surface of said array substrate,
    wherein said array substrate comprises:
      a switching element that controls the electric potential of said pixel electrode,
      a scanning line that supplies a signal to said switching element, and
      an electric field shield layer disposed in a space between said common electrode and said scanning line,
    wherein said electric field shield layer is connected to a constant-potential supply circuit and is maintained at an approximately constant electric potential.

28. An image display apparatus according to claim 27, wherein said electric field shield layer is maintained at approximately the same electric potential as said common electrode.

29. A method of making an image display device, comprising:
 providing an aperture between a pixel electrode and a common electrode;
 providing a scanning line and a signal line; and
 providing a shield layer separate from the common electrode to block an electric field generated by at least one of the scanning line and the signal line from passing through the aperture.

30. A method according to claim 29, wherein providing the shield layer comprises forming a shield layer of an electrically conductive and transparent material.

31. A method according to claim 29, further comprising additional apertures,
 wherein providing the shield layer comprises providing the shield layer to cover the apertures.

32. A method according to claim 31, further comprising providing additional pixel electrodes and common electrodes, wherein each aperture is defined between a corresponding pixel electrode and common electrode.

33. A method according to claim 29, further comprising providing a liquid crystal layer, the shield layer to block the electric field from passing through the aperture to the liquid crystal layer.

* * * * *